July 28, 1936.      E. C. HASENOUR      2,048,695
INDIVIDUAL MEDICINE GLASS RACK
Filed Aug. 6, 1934
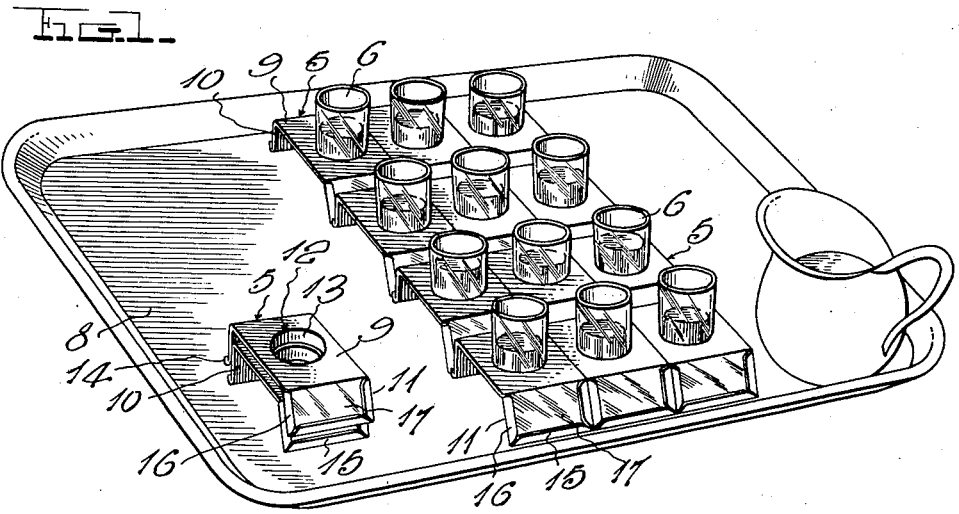
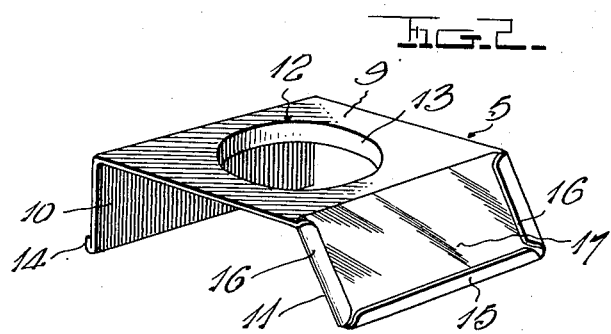
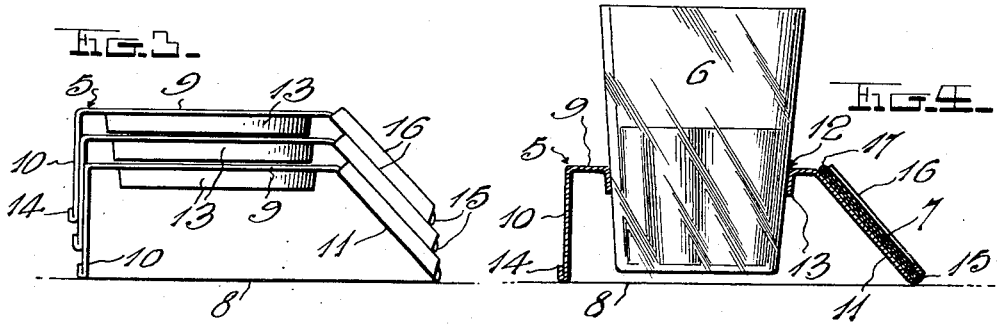
Witness
H. Woodard
Inventor
ELENOR C. HASENOUR
By H. B. Wilson & Co.
Attorneys.

Patented July 28, 1936

2,048,695

UNITED STATES PATENT OFFICE 2,048,695

INDIVIDUAL MEDICINE GLASS RACK

Elenor C. Hasenour, Washington, D. C.

Application August 6, 1934, Serial No. 738,723

3 Claims. (Cl. 65—61)

(Granted under the act of March 3, 1883, as amended April 30, 1928; 370 O. G. 757)

This invention described herein may be manufactured and used by or for the Government for governmental purposes, without the payment to me of any royalty thereon.

The invention aims to provide an extremely simple, inexpensive, convenient and durable device for use on hospital medicine trays to hold the glasses of medicine and to so identify the glasses for the various patients as to avoid danger of mistake.

The invention further aims to provide the holder with such holding means for an identification card, as to permit easy reading of the latter even though other holders and glasses may be in advance of it upon the tray.

A still further object is to provide a holder which is constructed and proportioned to so abut other holders on the tray as to prevent any of the glasses held by the holders from coming in contact with each other. There is thus eliminated the danger of a used glass touching and contaminating one which has not been used.

Yet another object is to provide a holder which is of such construction that a plurality may be compactly nested or stacked when not in use, allowing them to be kept in orderly fashion and in little space.

With the foregoing in view, the invention resides in the novel subject matter hereinafter described and claimed, description being accomplished by reference to the accompanying drawing.

Fig. 1 is a perspective view showing a plurality of the holders in use upon the usual medicine tray and illustrating two of the holders not in use and stacked.

Fig. 2 is a perspective view of one of the holders.

Fig. 3 is an end elevation showing a plurality of the holders stacked or nested.

Fig. 4 is a vertical sectional view cut from front to rear and illustrating the manner in which the glass is supported out of contact with the tray so that it will not contact with anything which may possibly have been spilled upon said tray.

In the drawing above briefly described, a preferred construction has been illustrated and while this construction will be herein specifically explained, it is to be understood that minor variations may be made within the scope of the invention as claimed.

Each glass holder is preferably formed from a single plate of aluminum or other light metal resistant to tarnish and the like, said plate being bent into the shape shown to provide an arched support 5 for a medicine glass 6 and an identification card 7. This support 5 is of considerably less height than a standard medicine glass and it is of such size and proportions that when a plurality of the supports are used upon a tray 8, the various glasses are held against contact with each other so that there is no danger of any glass becoming contaminated by contact with one which has been used.

The holding means for the card 7 is so positioned that this card is held in a rearwardly inclined position at the front of the support, in which position, it may be easily viewed even though other supports and glasses may be in advance of it. The card 7, while referred to herein as an identification card for brevity, may of course carry full instructions such as the patient's name, name of the medication, hour to be given, etc., thus making unnecessary the use of charts and books for this purpose. By use of various colored cards according to the different periods of the day and keeping the supports 5 stacked according to color, the need for individual reading as to time for use, is obviated.

The support 5, in the present disclosure, comprises a flat horizontal top plate 9, a vertical rear wall 10 projecting downwardly from the rear edge of said top plate, and a front wall 11 which projects downwardly and forwardly from said top plate, the lower edges of the walls 10 and 11 being parallel with each other. The top plate 9 is formed with a single circular opening 12 and with a downwardly projecting continuous flange 13 shaped to snugly surround the glass 6 and to support it a slight distance above the tray 8 so that it will not come in contact with any liquid which may have been spilled accidentally upon said tray. Moreover, by supporting the glass in this manner, it is more solidly held against tilting.

The two walls 10 and 11 are both adapted to rest upon the tray 8 and the lower edge of said wall 10 is preferably reinforced by bending it upwardly upon itself as denoted at 14. An upwardly bent flange 15 and two inwardly bent flanges 16 serve to reinforce the front wall 11 and also perform the function of holding the card 7 against the front side of said wall 11.

The card is preferably provided with a cover 17 of cellophane or the like, and it will be obvious that covers of different colors could be used instead of using cards of different colors, as above mentioned.

By providing the novel construction shown and described or an equivalent thereof, the holders can be placed on an ordinary tray in rows extending both longitudinally and transversely thereof, each holder being held against turning by contact with the adjacent holders. The number of holders may be increased or diminished as desired. They prevent spilling of the contents of the glasses, prevent the glasses from falling over and breaking, prevent used glasses from touching and contaminating others, and eliminate the possibility of mistake. The faces of the holders being inclined as shown, make reading of instructions easy even on holders behind others. The holders, being entirely separate from the tray, may be easily kept clean and sanitary and they may be orderly stacked or nested in little space when not in use. Added to these advantages, are the extreme simplicity and inexpensive nature of the device, making their use possible in all institutions where such use would be advisable.

A rack embodying elevated horizontal plate portions disposed in a row and having glass-receiving openings, supporting means for said plate portions holding them against relative turning and providing gaps (preferably V-shaped channels) between them, and means for mounting the identification cards so that all but the foremost thereof are readable in said gaps (or channels) possesses advantages both as to use and manufacture.

I claim:

1. In an individual medicine glass rack, a glass holder having means for holding a single medicine glass, said holder being adapted to rest upon a rectangular medicine tray, the sides of said holder being commensurate fractions of the length and width of the tray, allowing a plurality of the holders to be placed in rows extending both longitudinally and transversely of the tray, and means connected with the holder for mounting an upwardly and rearwardly inclined identification card on the front of said holder, said holder being provided with parallel front and rear positioning portions and with parallel laterally facing positioning portions all situated to abut adjacent holders and prevent turning of the herein defined holder upon the tray and therefore maintain the card in a forwardly presented position, said front and rear positioning portions being angularly related to provide a gap between the herein defined holder and the next adjacent holder directly in front thereof, the gap being of such width as to expose the identification card in a readable position, whereby upon placing a plurality of the holders in the aforesaid rows, the cards of all holders will be readable.

2. In an individual medicine glass rack, a glass holder whose sides are commensurate fractions of the length and width of a rectangular medicine tray, allowing a plurality of the holders to be placed in rows extending both longitudinally and transversely of the tray, said holder comprising a flat rectangular top plate disposed in a horizontal plane and having a single opening to receive a medicine glass, a vertical back wall projecting downwardly from the rear edge of said top plate and disposed in a plane at substantially right angles to said top plate, a front wall projecting downwardly and forwardly in an inclined plane from the front edge of said top plate, and means connected with said inclined front wall for holding an identification card against the front face of said inclined front wall, the lower edges of both of said walls being disposed in a plane parallel with the plane of said top plate to rest on the medicine tray, said lower edges being also parallel with each other, whereby the lower portion of the back wall of the herein defined holder may abut the lower portion of the front wall of an adjacent holder or vice versa and the abutting walls will then provide a channel having an inclined rear side carrying the identification card in a visible position, the inclination of said front wall being such as to render the card readable.

3. A dispensing system for medicines and the like comprising a series of individual racks arranged on a supporting surface in abutting relation and in rows extending lengthwise and crosswise of the surface, each rack including a horizontal portion formed with an opening adapted to receive and support a fluid container, the sides of the horizontal portion being commensurate fractions of the length and breadth of the supporting surface and arranged in parallelism, front and rear positioning portions depending from the horizontal portion and having their lower edges terminating in the same horizontal plane, means on the front positioning portion for supporting an identification card, the front positioning portion being angularly related with respect to the rear portion so as to present the identification card in a downwardly and forwardly inclined position and to provide a series of inspection channels extending lengthwise of the supporting surface and between the racks to expose the identification card in a readable position, whereby the cards of all the racks will be readable.

ELENOR C. HASENOUR.